3,480,758
METHOD OF ELECTRIC-ARC WELDING OF PIPE JOINTS
Vladislav Vasilievich Roschin, Inzhenernaya ul. 10, korp. 1, kv. 16, Moscow, U.S.S.R.; Boris Ivanovich Muromtsev, Ul. Depovskaya 7, kv., Lobnya, Moskovskaya obl., U.S.S.R.; and Gennady Nilolaevich Gusakov, Podmoskovnee shosse, 13a, kv. 96; and Leonid Ivanovich Maslov, Varshavskoe shosse, 194, korp. 3, kv. 61; both of Moscow, U.S.S.R.
No Drawing. Filed Jan. 12, 1968, Ser. No. 697,309
Int. Cl. B23k 9/00, 31/06
U.S. Cl. 219—137                     1 Claim

ABSTRACT OF THE DISCLOSURE

A method of electric arc welding of pipe joints with the use of a non-consumable electrode under protective gas atmosphere and without the use of a filler wire. Welding is carried out in a plurality of passes. Incomplete weld penetration of the pipe wall is obtained in the first pass, subsequent passes yielding increased penetration until complete penetration is reached.

---

The present invention relates to methods of electric arc welding of pipe joints, and more particularly to methods of electric-arc welding of pipe joints with the use of a non-consumable electrode under protective gas atmosphere and without the use of a filler wire.

The invention may be used to the best advantage for welding fixed pipe joints.

Known in the prior art is a method of electric arc welding of fixed pipe joints with the use of a non-consumable welding electrode under protective gas atmosphere.

The welding process is effected in a plurality of passes in the following manner.

The first pass is made under welding conditions providing for a full penetration throughout a pipe wall. A non-uniform formation of the weld seam occurs thereby on the internal and external sides of the pipe, consisting in sagging of the weld metal and the formation of meniscus.

To improve the formation of the weld on the pipe internal side, programming of the welding conditions will have to be effected, while for improving the weld formation on the pipe external side there are required a number (3 to 7) of additional passes to be made under welding conditions featuring a lower intensity of the welding current or a faster rate of welding as compared with those observed under conditions of welding during the first pass.

An object of the present invention is to provide a method of electric-arc welding of pipe joints by using a non-consumable welding electrode under protective gas atmosphere without the use of a filler wire, in which welding is carried out in a plurality of passes, and which would allow a welding seam to be formed uniformly both on the external and internal sides of the pipe.

In conformity with the above-said and other objects, the essential feature of the invention consists in using a method of electric arc welding of pipe joints, in which, according to the invention, all the passes are made under constant welding conditions, ensuring during the first pass obtaining of an incomplete penetration of the pipe wall and increasing of the penetration depth during the subsequent passes up to the complete one.

The proposed method of welding is effected as follows.

The welding process is carried into effect in a plurality of passes under constant welding conditions.

The first pass is made under conditions providing for an incomplete penetration through the pipe wall. The penetration depth may be thereby equal for example, to ⅓, ½, ¾ of the total wall thickness.

Then, without interrupting the welding process, a number (3 to 7) of the subsequent passes are made under the same welding conditions. The number of the subsequent passes depends upon the thickness of the pipe wall and penetration depth, as obtained during the first pass.

When making the subsequent passes, the depth of penetration of the pipe wall is increased up to the complete penetration thereof. The gradual penetration results in the uniform weld formation both on the internal and external sides of the pipe being welded.

The nature of the present invention will become more fully apparent from a consideration of the follnwing description of an exemplary embodiment thereof.

A joint of pipes is to be welded from stainless steel 32 mm. in diameter and wall thickness $\delta = 4$ mm. with the use of a tungsten welding electrode under argon atmosphere.

Depending upon the thickness of the pipe wall, the first pass is to be made under following welding conditions: current intensity $J = 100$ amp; voltage $U = 10$ v.; rate of welding $V = 0.9$ cm./sec.

The depth of penetration is thereby equal to 1.7 mm.

Subsequently, without interrupting the welding process, 4 passes are made until the full penetration of the pipe wall is achieved under the same welding conditions.

The proposed method of welding allows an improvement in the weld formation and a gradual formation of the weld seam both on the internal and external sides of the pipe.

Moreover, in case of necessity, there is possible obtaining of a prescribed weld penetration of the pipe wall.

When employing this method of welding, complicated programming of the welding process according to the welding current or rate of welding can be dispensed with.

What is claimed is:

1. A method of electric arc welding of pipe joints by using a non-consumable welding electrode under protective gas atmosphere without the use of a filler wire, comprising welding in a plurality of passes, with all the passes being made under constant welding conditions ensuring obtaining of an incomplete weld penetration of the pipe wall in the first pass and increasing of the depth of penetration during the subsequent passes until the complete penetration is reached.

References Cited

UNITED STATES PATENTS 3,223,816  12/1965  Marsden _____ 219—61
3,230,340  1/1966   Glotthorn et al. ___ 219—60 X JOSEPH V. TRUHE, Primary Examiner
C. L. ALBRITTON, Assistant Examiner U.S. Cl. X.R.
219—61